United States Patent
Sohn et al.

(10) Patent No.: US 6,938,584 B2
(45) Date of Patent: Sep. 6, 2005

(54) FEEDWATER CONTROL SYSTEM CONSIDERING PRESSURE DROP OF FEEDWATER CONTROL VALVE IN NUCLEAR POWER PLANT AND CONTROL METHOD THEREFOR

(75) Inventors: Suk Whun Sohn, Daejeon (KR); In Ho Song, Daejeon (KR); Jong Joo Sohn, Daejeon (KR); Jong Tae Seo, Daejeon (KR)

(73) Assignee: Korea Power Engineering Company, Inc., Kyungki-Do (KR)

( * ) Notice: Subject to any disclaimer, the term of this patent is extended or adjusted under 35 U.S.C. 154(b) by 25 days.

(21) Appl. No.: 10/885,681

(22) Filed: Jul. 8, 2004

(65) Prior Publication Data

US 2005/0072380 A1 Apr. 7, 2005

(30) Foreign Application Priority Data

Jul. 19, 2003 (KR) ................................. 10-2003-0049539

(51) Int. Cl.[7] .............................................. F22B 37/46
(52) U.S. Cl. ............................... 122/448.1; 122/451 R; 376/207
(58) Field of Search .......................... 122/448.1, 448.2, 122/451 R, 447; 376/207

(56) References Cited

U.S. PATENT DOCUMENTS 4,074,360 A * 2/1978 Stadie et al. .................. 701/99
4,777,009 A * 10/1988 Singh et al. .................. 376/211
5,287,390 A * 2/1994 Scarola et al. ............... 376/216
6,055,945 A * 5/2000 Simoni .................... 122/451 R

* cited by examiner

Primary Examiner—Gregory Wilson
(74) Attorney, Agent, or Firm—Nixon & Vanderhye P.C.

(57) ABSTRACT

A feedwater control system considering a pressure drop of feedwater control valve in a nuclear power plant and a control method therefor are provided. In the feedwater control system, a first detection unit includes: a flow error signal generator for generating a flow error signal corresponding to a difference between a steam flow signal and a feedwater flow signal; and a water level correction error signal generator for generating a water level correction error signal corresponding to a sum of a water level measurement signal and the flow error signal. A second detection unit includes: a pressure drop sensor unit for detecting a pressure difference between front and rear portions of at least one feedwater control valve among the main feedwater control valves and the downcorner feedwater control valves and generating a pressure drop signal corresponding to the detected pressure difference; a pressure drop setup value signal generator for generating a pressure drop setup value signal corresponding to a previously set pressure drop setup value of the feedwater control valves; and a pressure drop error signal generator for comparing the pressure drop signal with the pressure drop setup value signal and generating a pressure drop error signal. A control unit controls the main feedwater pump based on a correction control signal output from the correction control signal generator.

10 Claims, 5 Drawing Sheets

FEEDWATER CONTROL SYSTEM CONSIDERING PRESSURE DROP OF FEEDWATER CONTROL VALVE IN NUCLEAR POWER PLANT AND CONTROL METHOD THEREFOR

BACKGROUND OF THE INVENTION

This application claims the priority of Korean Patent Application No. 2003-49539, filed on Jul. 19, 2003, in the Korean Intellectual Property Office, the disclosure of which is incorporated herein in its entirety by reference.

1. Field of the Invention

The present invention relates to a feedwater control system and a control method therefor, and more particularly, to a feedwater control system considering a pressure drop of a feedwater control valve in a nuclear power plant and a control method therefor, which are capable of constantly maintaining the pressure drop of the feedwater control valves regardless of a nuclear reactor power or kinds and number of feedwater equipments.

2. Description of the Related Art

A nuclear power plant generally includes systems having 100 or more separate functions. The systems include a nuclear steam supply system (NSSS) centering on a nuclear reactor, a turbine/generator system which receives steam to turn a generator to generate electricity, and other additional equipments. At present, a pressurized water reactor (PWR) is mainly used in Korean nuclear power plants and includes a primary system centering on a nuclear reactor, a secondary system having a steam generator, a turbine, a generator and a condenser, an engineering safety equipment system in preparation for accidents, a power transmission/ distribution system, a measurement/control system, and other auxiliary systems.

Hot water generated at the nuclear reactor is circulated through a heat transfer pipe of the steam generator, which is connected through a coolant pipe to the nuclear reactor. Also, the hot water transfers heat to water that is fed into the steam generator through another pipe, and then returns to the nuclear reactor. In order to perform such operations naturally, the steam generator must properly maintain the water level. This is usually achieved by a feedwater control system of the nuclear power plant that constantly controls the water level of the steam generator.

FIG. 1 illustrates electrical paths in a feedwater control system of a nuclear power plant according to the prior art. Referring to FIG. 1, the feedwater control system of a nuclear power plant includes a detection block 110 for generating a water level correction error signal 115c, and a control block 130 for controlling a main feedwater pump 103, a main feedwater control valve 105 and a downcorner control valve 107 based on a flow request signal 131c, which is processed through a proportional integrator 131.

The detection block 110 detects a water level correction error and includes a flow error signal generator 111 for generating a flow error signal 111c, and a water level correction error signal generator 115 for generating a water level correction error signal 115c. The flow error signal generator 111 receives a steam flow signal 111a corresponding to a steam flow, which is discharged from a steam generator, and a feedwater flow signal 111b corresponding to a feedwater flow, which is introduced into the steam generator, and generates the flow error signal 111c. The flow error signal 111c is input to the water level correction error signal generator 115. The water level correction error signal generator 115 sums the flow error signal 111c and a water level measurement signal and generates the water level correction error signal 115c. Here, the water level measurement signal is a signal corresponding to a difference between a water level measurement signal 115a and a water level setup signal 115b. The water level measurement signal 115a corresponds to a measured water level of the steam generator and the water level setup signal 115b corresponds to a previously set water level of the steam generator.

The control block 120 passes the water level correction error signal 115c through the proportional integrator 131, thereby generating the flow request signal 131c. Then, a main feedwater pump speed signal converter 133, a main feedwater control valve opening signal converter 138 and a downcorner control valve opening signal generator 139 convert the flow request signal 131c into control signals for controlling a main feedwater pump 103, a main feedwater control valve 105 and a downcorner feedwater control valve 107, respectively. The main feedwater pump 103, the main feedwater control valve 105 and the downcorner feedwater control valve 107 are controlled by the control signals. As a result, the water level of the steam generator is adjusted. Since the main feedwater pump 103 is connected to two steam generators through a common pipe, the flow request signal 131c from the proportional integrator 131 to the main feedwater pump 103 passes through a high signal selector 132 before it is input to the main feedwater pump speed signal converter 133. The flow request signal 131c is compared with another flow request signal output from a feedwater control system of another steam generator. A high flow request signal is selected and output to the main feedwater pump speed signal converter 133.

The above-mentioned method is a three-factor control method of generating the flow request signal, which is a control signal, using three variables as a control input signal in a high power control mode of about 20% or more nuclear reactor power. The three variables are the water level measurement signal, the feedwater flow signal and the steam flow signal. However, a one-factor control method is used in a low power mode of 20% or less nuclear reactor power. In other words, the flow request signal is generated using only the water level measurement signal because the feedwater flow signal and the steam flow signal have a low reliability.

Kinds and number of feedwater equipments used in the nuclear power plant depend on the generated nuclear power. In the low power mode of 20% or less nuclear reactor power, the main feedwater control valve is closed and the main feedwater pump operates at a lowest speed. Therefore, an actual feedwater flow control function is performed by the downcorner feedwater control valve. In the high power mode of 20% or more nuclear reactor power, the downcorner feedwater control valve is opened to pass about 10% of a whole feedwater flow and the feedwater flow control function is performed by the main feedwater control valve 105 and the main feedwater pump 103. Also, in the 20% or more nuclear reactor power, only one main feedwater pump operates in 50% or less nuclear reactor power. Meanwhile, in the 50% or more nuclear reactor power, two main feedwater pumps operate. In the 100% nuclear reactor power, three main feedwater pumps may operate at the same time.

The feedwater control system of the steam generator according to the prior art does not consider pressure drop of the feedwater control valve. The pressure drop cannot be maintained constantly according to the nuclear reactor power or the kinds and number of the operating feedwater equipment.

In a low power operation section of the nuclear reactor, the main feedwater pump speed is maintained constantly. Therefore, while a front pressure of the downcorner feedwater control valve is constantly maintained, a rear pressure of the downcorner feedwater control valve is changed depending on a pressure variation of the steam generator. The steam generator operates at low or high pressures due to various factors, such as a nuclear reactor power control method or an operation way of operators. Accordingly, in the low power operation section, pressure drop of the downcorner feedwater control valve is greatly changed. Such change of the pressure drop has a bad effect in controlling the water level of the steam generator and can be determined from the following equation:

$$Q = Cv \times \sqrt{\frac{\Delta P}{\gamma}} \quad (1)$$

where Q is a feedwater flow, Cv is a flow coefficient, $\gamma$ is a specific weight, and $\Delta P$ is a pressure drop.

As can be seen from the equation (1), the feedwater flow passing through the valve is a function of the pressure drop, the flow efficient, and the specific weight. Among them, the specific weight is a function of the feedwater temperature and is a predictable value. The flow coefficient is a function of the opening of the downcorner feedwater control valve. The flow coefficient is reflected on the downcorner control valve opening signal converter and is a predictable value. Accordingly, it can be seen that the pressure drop of the downcorner feedwater control valve is a main factor to change the feedwater flow. However, in the low power operation section, the feedwater control system of the steam generator uses only the water level of the steam generator as an input. Thus, such flow change according to the pressure variation cannot be reflected rightly. If the pressure of the steam generator in the low power of the nuclear reactor is not stable, it is difficult to stably control the water level of the steam generator.

FIG. 2 illustrates a variation in pressure drop of the main feedwater control valve according to power of the main feedwater control valve in the conventional feedwater control system of the nuclear power plant. Referring to FIG. 2, in a high power operation section of the nuclear reactor, when one main feedwater pump is operating and another main feedwater pump is additionally operating since the power becomes 50% or more, a pressure drop applied to the main feedwater control valve is greatly increased. Such a phenomenon occurs due to characteristics of pressure head versus flow in the main feedwater pump. When one main feedwater pump is operated, a flow passing one main feedwater pump is decreased, such that the pressure head is increased. The increase of the feedwater flow and the water level rise of the steam generator due to the rapid rise of the pressure head makes the flow request signal decrease. Since the flow request signal controls the main feedwater pump speed and the opening of the main feedwater control valve at the same time, the opening of the main feedwater control valve as well as the main feedwater pump speed is decreased. Accordingly, since the main feedwater pump speed is not reduced as much as the increased pressure head, the front pressure of the main feedwater control valve rises, thereby increasing the pressure drop of the main feedwater control valve. Further, such phenomena occur severely in nuclear power plants in which three main feedwater pumps are operating at 100% power. If the pressure drop of the main feedwater control valve is changed according to the power, several problems may occur. In case when the pressure drop of the main feedwater control valve is high, the control may be unstable. On the other hand, in case when the pressure drop of the main feedwater control valve is low, the water level control capability is reduced, so that the control is difficult.

Considering these problems, the conventional nuclear power plants uses a method of measuring a pressure drop of the main feedwater control valve and controlling the speed of the feedwater pump. However, this method is constituted with an independent control system, asides from the water level control of the steam generator. Since the speed of the main feedwater pump is controlled using only the valve pressure drop as an input, it is difficult to properly cope with the rapid transition state in the water level of the steam generator. If the input signals are lost, the rapid transition state may occur, so that this method is not a proper approach.

In the conventional feedwater control system of the nuclear power plant and the control method therefor, the severe variation in the pressure drop of the feedwater control valve has a bad effect in controlling the water level of the steam generator. However, it is difficult to stably control the water level of the steam generator because the flow variation according to such pressure drop is not reflected rightly. Specifically, if the pressure drop of the main feedwater control valve is high, the control may become unstable. Also, if the pressure drop of the main feedwater control valve is low, the performance in the water level control of the steam generator is degraded. Accordingly, it is difficult to select the setup values of the feedwater control system in order to solve such problems. Also, it is difficult to optimize the control setup values.

SUMMARY OF THE INVENTION

The present invention provides a feedwater control system considering a pressure drop of a feedwater control valve in a nuclear power plant and a control method therefor, in which pressure drop of feedwater control valves is constantly maintained regardless of a nuclear reactor power or kinds and number of feedwater equipments, such that the process of selecting the setup value of the feedwater control system is simplified and the optimization is possible. Also, it is possible to solve the control instability or the degradation of the control performance, which may be caused by the high or low pressure drop of the feedwater control valves.

According to an aspect of the present invention, there is provided a feedwater control system considering pressure drop of feedwater control valves in a nuclear power plant, the feedwater control system for controlling a water level of a steam generator by adjusting a feedwater flow introduced into the steam generator through a control of one or more main feedwater pumps, main feedwater control valves and downcorner feedwater control valves. In the feedwater control system, a first detection unit includes: a flow error signal generator for generating a flow error signal corresponding to a difference between a steam flow signal and a feedwater flow signal, wherein the steam flow signal corresponds to a steam flow discharged from the steam generator and the feedwater flow signal corresponds to a feedwater flow introduced into the steam generator; and a water level correction error signal generator for generating a water level correction error signal corresponding to a sum of a water level measurement signal and the flow error signal, wherein the water level measurement signal corresponds to a difference between a water level measurement signal and a water level setup signal, the water level measurement signal corresponding to a measured water level of the steam generator, the water level setup signal corresponding to a previously set water level of the steam generator. A second detection unit includes: a pressure drop sensor unit for detecting a pressure difference between front and rear portions of at least one feedwater control valve among the main feedwater control valves and the downcorner feedwater control valves and generating a pressure drop signal corresponding to the detected pressure difference; a pressure drop setup value signal generator for generating a pressure drop setup value signal corresponding to a previously set pressure drop setup value of the feedwater control valves; and a pressure drop error signal generator for comparing the pressure drop signal with the pressure drop setup value signal and generating a pressure drop error signal. A control unit includes: a first proportional integrator through which the water level correction error signal passes; a main feedwater pump speed signal converter through which a flow request signal processed through the first proportional integrator passes; a second proportional integrator through which the pressure drop error signal passes; a feedwater pump speed bias signal converter through which a bias signal processed through the second proportional integrator passes; and a correction control signal generator in which an auxiliary control signal output from the feedwater pump speed bias signal converter is operated on a main control signal output from the main feedwater pump speed signal converter, wherein the control unit controls the main feedwater pump based on a correction control signal output from the correction control signal generator.

The pressure drop sensor unit may include: a main feedwater common header pressure sensor which measures pressures of main feedwater common headers installed between the main feedwater pump and the feedwater control valves; and a steam header pressure sensor which measures a pressure of a steam header through which steam discharged from the steam generator passes, and the pressure drop signal may be a difference between main feedwater header pressure signal and steam header pressure signal, which are respectively output from the main feedwater common header pressure sensor and the steam header pressure sensor.

The pressure drop setup value signal generator may further include a low power bias signal generator for generating a low power bias signal, and the low power bias signal may be added to the pressure drop setup value signal in case when the downcorner feedwater control valve alone is operated while the main feedwater control valve is not operated.

The control unit may further include a first high signal selector for comparing the flow request signal, which is processed through the first proportional integrator, with another flow request signal output from another feedwater control system of another steam generator before the flow request signal is input to the main feedwater pump speed signal converter, and selecting a high flow request signal.

The control unit may further include a second high signal selector for comparing the auxiliary control signal, which is output from the feedwater pump speed bias signal generator, with another auxiliary control signal output from another feedwater control system of another steam generator before the auxiliary control signal is operated on at the correction control signal generator, and selecting a high auxiliary control signal.

According to another aspect of the present invention, there is provided a feedwater control method considering pressure drop of feedwater control valves in a nuclear power plant, the feedwater control method for controlling a water level of a steam generator by adjusting a feedwater flow introduced into the steam generator through a control of one or more main feedwater pumps, main feedwater control valves and downcorner feedwater control valves. The feedwater control method includes: (a) measuring a water level of the steam generator and generating a water level measurement signal corresponding to the measured water level; generating a water level measurement signal corresponding to a difference between the water level measurement signal and a water level setup signal, in which the water level setup signal corresponds to a previously set water level of the steam generator; measuring a steam flow discharged from the steam generator and generating a steam flow signal corresponding to the measured steam flow; measuring a feedwater flow introduced into the steam generator and generating a feedwater flow signal corresponding to the measured steam flow; generating a flow error signal corresponding to a difference the steam flow signal and the feedwater flow signal; and generating a water level correction error signal corresponding to a sum of the water level measurement signal and the flow error signal; (b) detecting a pressure difference between front and rear portions of at least one feedwater control valve among the main feedwater control valves and the downcorner feedwater control valves and generating a pressure drop signal corresponding to the detected pressure difference; and comparing the pressure drop signal with a previously set pressure drop setup value signal and generating a pressure drop error signal; and (c) generating a main control signal by passing a flow request signal through a main feedwater pump speed signal converter, the flow request signal being generated by passing the water level correction error signal through a first proportional integrator; generating an auxiliary control signal by passing a bias signal through a feedwater pump speed bias signal converter, the bias signal being generated by passing the pressure drop error signal through a second proportional integrator; generating a correction control signal by performing an operation of the main control signal and the auxiliary control signal; and controlling the main feedwater pump, based on the correction control signal.

The pressure drop signal in operation (b) may be obtained by: measuring pressures of main feedwater common headers installed between the main feedwater pump and the feedwater control valves; measuring pressure of a steam header through which steam discharged from the steam generator passes; and operating a difference between the pressure of the main feedwater common header and the pressure of the steam header.

The pressure drop setup value signal may be a signal to which a predetermined low power bias signal is added when the downcorner feedwater control valve alone is operated while the main feedwater control valve is not operated.

Operation (c) may further include: comparing the flow request signal, which is processed through the first proportional integrator, with another flow request signal output from another feedwater control system of another steam generator before the flow request signal is input to the main feedwater pump speed signal converter; and selecting a high flow request signal.

Operation (c) may further include: comparing the auxiliary control signal, which is output from the feedwater pump speed bias signal generator, with another auxiliary control signal output from another feedwater control system of another steam generator before the auxiliary control signal is operated on at the correction control signal generator; and selecting a high auxiliary control signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
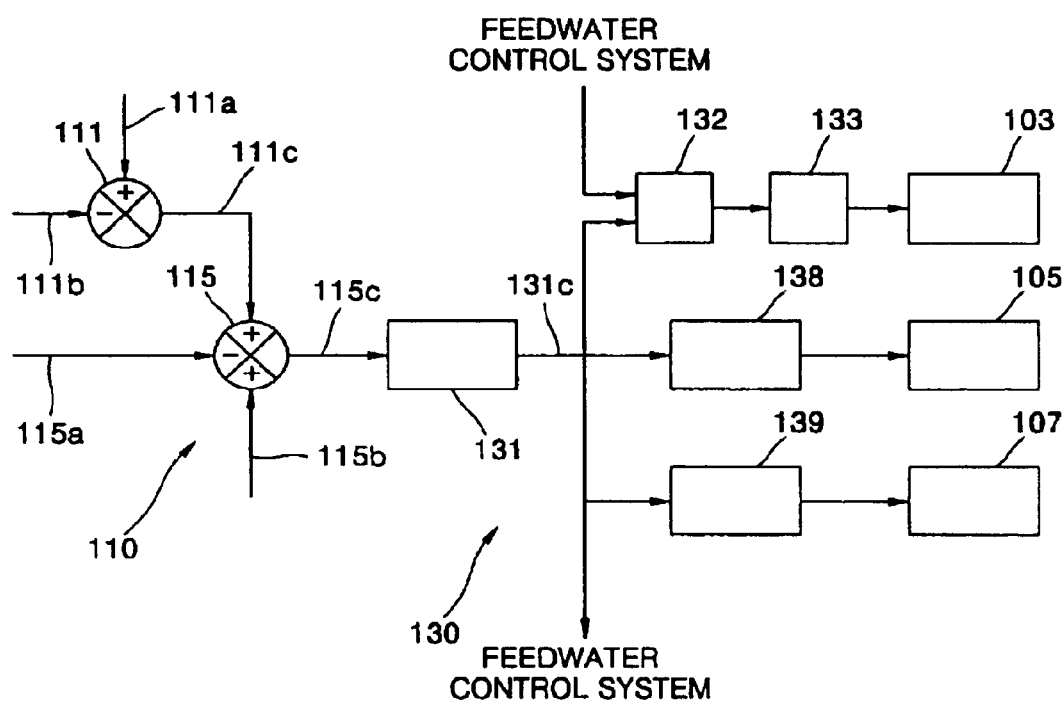
FIG. 1 illustrates electrical paths in a feedwater control system of a nuclear power plant according to the prior art.
Figure 2:
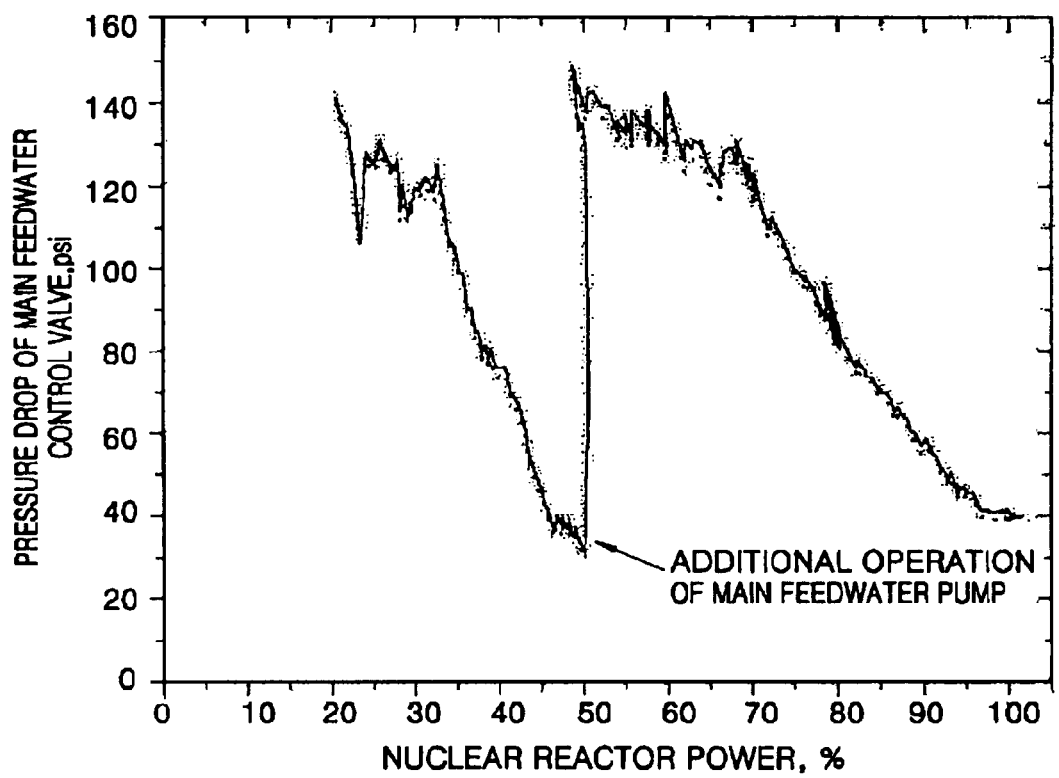
FIG. 2 illustrates a variation in pressure drop of a main feedwater control valve according to a power of the main feedwater control valve in a conventional feedwater control system of a nuclear power plant.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus their description will be omitted.

Figure 3:
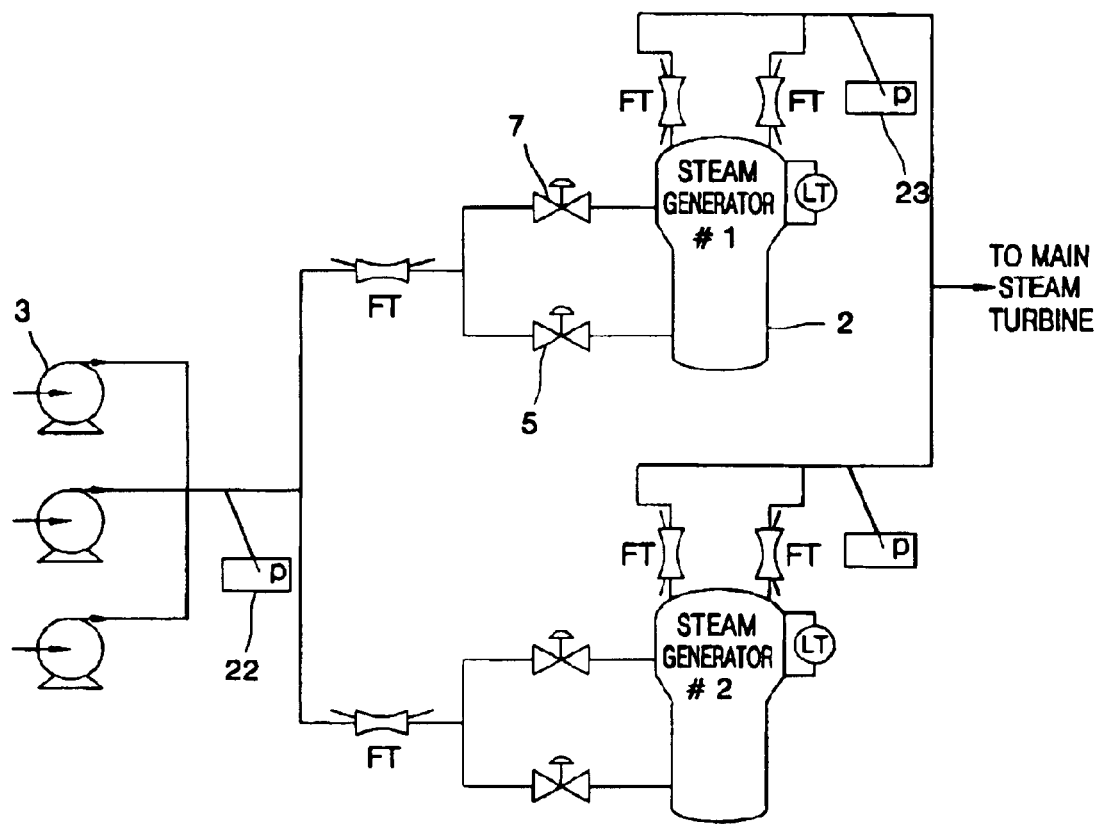
FIG. 3 illustrates a functional structure of a feedwater control system in a nuclear power plant.

FIG. 3 illustrates a functional structure of a feedwater control system in a nuclear power plant. Referring to FIG. 3, a feedwater flow supplied from three main feedwater pumps 3 is distributed to two steam generators 2 through a main feedwater common header, and passes through main feedwater control valves 5 and downcorner feedwater control valves 7, which are installed in front of the steam generators 2. Then, the feedwater flow is introduced into the steam generators 2. A steam flow discharged from the steam generators 2 passes through a steam header and is introduced into a main steam turbine. A main feedwater common header pressure sensor 22 is installed in the main feedwater common header. The main feedwater common header pressure sensor 22 measures and indicates a pressure of the main feedwater common header. A steam header pressure sensor 23 is installed in the steam header and measures a pressure of the steam header, which is used as an input of steam bypass control system (SBCS).

Figure 4:
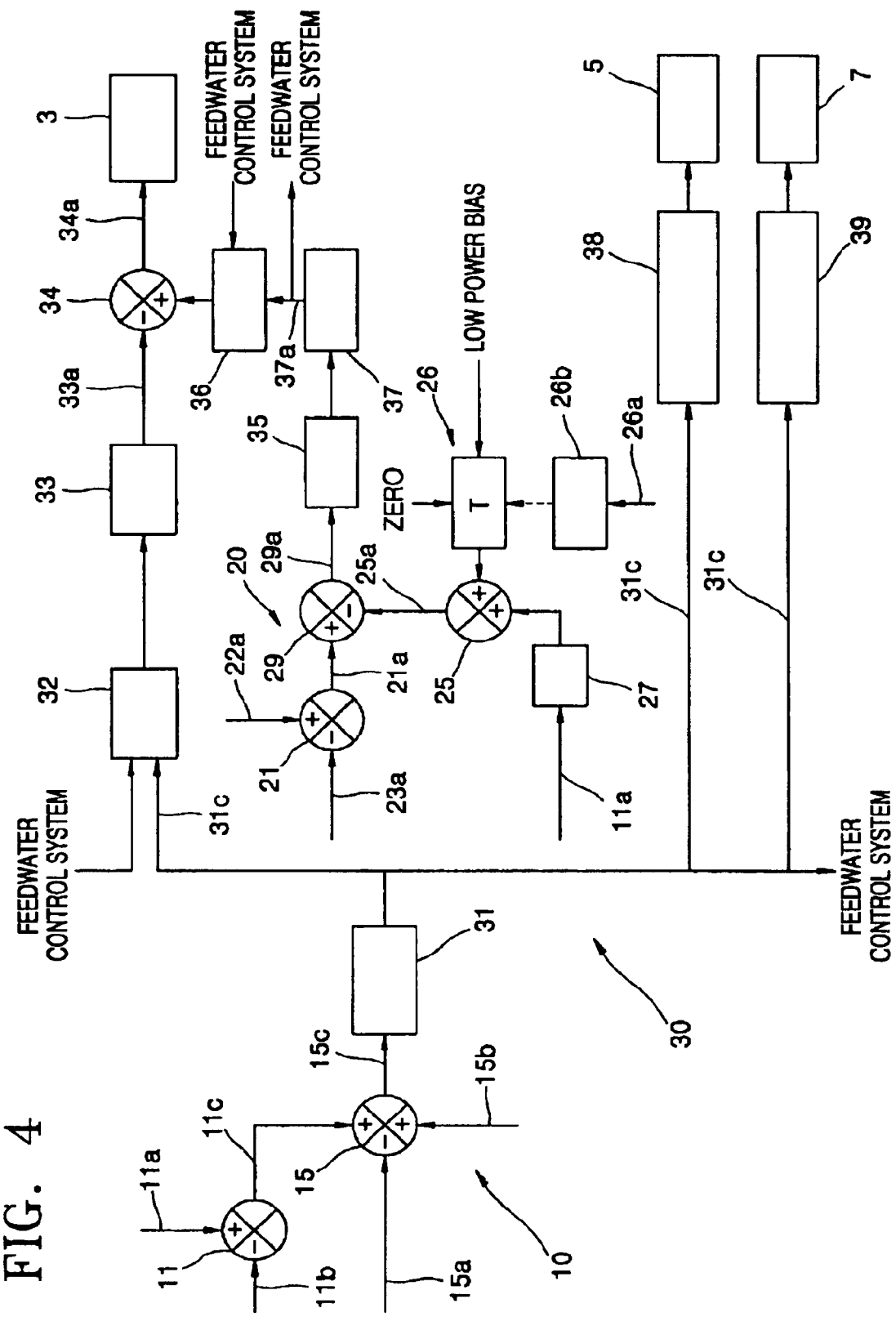
FIG. 4 illustrates electrical paths of a feedwater control system considering pressure drop of a feedwater control valve in a nuclear power plant according to an embodiment of the present invention.

FIG. 4 illustrates electrical paths of a feedwater control system considering pressure drop of a feedwater control valve in a nuclear power plant according to an embodiment of the present invention. Referring to FIG. 4, a feedwater control system of a steam generator according to an embodiment of the present invention includes a first detection unit 10 for generating a water level correction error signal 15c, a second detection unit 20 for generating a pressure drop error signal 29a, and a control unit 30 for controlling the main feedwater control valve 5 and the downcorner feedwater control valve 7 according to the flow request signal 31c based on the water level correction error signal 15c, generating a correction control signal 34a through an operation of an auxiliary control signal, based on the pressure drop error signal 29a, to a main control signal 33a, and controlling the main feedwater pump 3 based on the correction control signal 34a.

The first detection unit 10 detects the water level correction error and includes 10a flow error signal generator 11 for generating a flow error signal 11c, and a water level correction signal generator 15 for generating the water level correction error signal 15c. The flow error signal generator 11 receives the steam flow signal 11a, which corresponds to a steam flow discharged from the steam generator, and the feedwater flow signal 11b, which corresponds to the feedwater flow introduced into the steam generator, and generates the flow error signal 11c corresponding to a difference between the steam flow signal 11a and the feedwater flow signal 11b. The water level correction error signal generator 15 sums a water level measurement signal and the flow error signal 11c and generates the water level correction error signal 15c. Here, the water level measurement signal corresponds to a difference between a water level measurement signal 15a and a water level setup signal 15b. The water level measurement signal 15a corresponds to a measured water level of the steam generator and the water level setup signal 15b corresponds to a previously set water level of the steam generator.

The second detection 20 includes a pressure drop sensor unit 21 for detecting a pressure difference between front and rear portions of the main feedwater control valve 5 and the downcorner feedwater control valve 7 and outputting a corresponding pressure drop signal 21a, a pressure drop setup value signal generator 25 for outputting the pressure drop setup value signal 25a corresponding to previously set pressure drop setup values of the feedwater control valves 5 and 7, and a pressure drop error signal generator 29 for comparing the pressure drop signal 21a and the pressure drop setup value signal 25a and generating the pressure drop error signal 29a.

In a low power operation mode of the nuclear reactor, the pressure drop signal of the downcorner feedwater control valve 7 is mainly used, and in a high power operation mode of 20% or more, the pressure signal of the main feedwater control valve 5 is preferably used. Accordingly, two structures can be provided in order to obtain the pressure drop signal 21a of the pressure drop sensor unit 21. A first structure is to additionally provide a pressure sensor to measure pressures at the front portions of the feedwater control valves and the rear portions of the feedwater control valves in which a fluid passing the feedwater control valves is stabilized. A second structure is to calculate the pressure drop using signals that are previously measured at the nuclear power plant. Such a structure can be implemented without any additional hardware installation. In this embodiment, the pressure sensor unit 21 has the latter structure. The pressure sensor unit 21 includes a steam header pressure sensor 23 for measuring pressure of the main feedwater common headers arranged between the main feedwater pump 3 and the feedwater control valves, and a steam header pressure sensor 23 for measuring pressure of the steam header through which steam discharged from the steam generator passes. In such a structure, the pressure sensor unit 21 detects a difference between the steam header pressure signal 22a and the main feedwater common header pressure signal 23a and outputs the pressure drop signal 21a. The steam header pressure signal 22a is a signal used as the input of the SBCS and the main feedwater common header pressure signal 23a is a signal used as only a simply indicator.

The pressure drop setup value signal generator 25 outputs the pressure drop setup value signal 25a through the pressure drop setup value signal converter 27, which is previously programmed using the steam flow signal 11a. When the feedwater control system operates with only the downcorner feedwater control valve 7 in less than 20% nuclear reactor power, the pressure drop of the downcorner feedwater pipe is considered and a low power bias is added to the pressure drop setup value. The pressure drop error signal generator 29a compares the pressure drop signal 21a with the pressure drop setup value signal 25a and outputs the pressure drop error signal 29a of the feedwater control valve. Reference numeral 26a denotes a nuclear reactor power, and reference numeral 26b denotes a "Bistable".

The control unit 30 includes a first proportional integrator 31 through which the water level correction error signal 15c passes, a main feedwater pump speed signal converter 33 through which the flow request signal 31c processed through the first proportional integrator 31 passes, a second proportional integrator 35 through which the pressure drop error signal 29a passes, a feedwater pump speed bias signal converter 37 through which a bias signal processed through the second proportional integrator 35 passes, and a correction control signal generator 34 in which the auxiliary control signal 37a output from the feedwater pump speed bias signal converter 37 is operated to the main control signal 33a output from the main feedwater pump speed signal converter 33. The control unit 30 controls the main feedwater pump 3 based on the correction control signal 34a output from the correction control signal generator 304. Also, the flow request signals 31c are transmitted to the main feedwater control valve opening signal converter 38 and the downcorner control valve opening signal converter 39 and then converted into signals for controlling the main feedwater control valve 5 and the downcorner feedwater control valve 7, respectively.

The pressure drop error signal 29a is transmitted through the second proportional integrator 35 to the feedwater pump speed bias signal converter 37. The auxiliary control signal 37a is input to a second high signal selection unit 36 and compared with another auxiliary control signal output from another feedwater control system. Then, among them, a selected high signal is added/subtracted to/from the main control signal 33a and transmitted to the main feedwater pump 3. In other words, the main feedwater pump 3 is controlled by the correction error signal 34a, which is a corrected main control signal 33a by the auxiliary control signal 37a based on the pressure drop error signal 29a, in order to constantly maintain the pressure drop of the feedwater control valves 5 and 7 without regard to the nuclear reactor power or the kinds and number of the operating feedwater equipments. Here, the auxiliary control signal 37a is a bias signal. Therefore, if necessary, the auxiliary control signal 37a may not be output.

A feedwater control method of the nuclear power plant considering the pressure drop of the feedwater control valve according to the present invention will now be described.

First, the water level of the steam generator is measured and the water level measurement signal 15a corresponding to the water level is generated. Then, the water level measurement signal corresponding to a difference between the water level measurement signal 15a and the water level setup signal 15b is generated. In the same manner, the feedwater flow discharged from the steam generator is measured and the steam flow signal 11a corresponding to the steam flow is generated. The feedwater flow introduced into the steam generator is measured and the feedwater flow signal 11b corresponding to the feedwater flow is generated. Then, the flow error signal 11c corresponding to a difference between the steam flow signal 11a and the feedwater flow signal 11b is generated. The first detection unit 10 generates the water level correction error signal 15c corresponding to a sum of the water level measurement signal and the flow error signal 11c.

The pressures of the main feedwater common header and the steam header are measured and the pressure drop signal 21a corresponding to the pressure difference is generated. The pressure drop signal 21a and the previously set pressure drop setup value signal 25a are compared with each other to generate the pressure drop error signal 29a.

Then, in the control unit 30, the water level correction error signal 15c passes through the first proportional integrator 31 to generate the flow request signal 31c. The flow request signal 31c is transmitted to the main feedwater control valve opening signal converter 38 and the downcorner control valve opening signal converter 39. The main feedwater control valve 5 and the downcorner feedwater control valve 7 are controlled by the control signals, which are output from the main feedwater control valve opening signal converter 38 and the downcorner control valve opening signal converter 39. The flow request signal 31c passing the first proportional integrator 31 is transmitted to the main feedwater pump speed signal converter 33. Since the main feedwater pump 3 is connected to two steam generators through the common pipe, the flow request signal 31c passes the first high signal selection unit 32 before it is input to the main feedwater pump speed signal converter 33. Here, the flow request signal 31c is compared with another flow request signal output from the feedwater control system of another steam generator. Among them, the high flow request signal 31c is selected and output to the main feedwater pump speed signal generator 33. The main control signal 33a output from the main feedwater pump speed signal converter 33 is operated on the auxiliary control signal 37a output from the feedwater pump speed bias signal converter 37 in order to consider the pressure drop of the feedwater control valves before controlling the main feedwater pump 3.

A description about the process of generating the correction control signal 34a will be made in detail. The pressure drop signal 21a and the previously set pressure drop setup value signal 25a are compared with each other to generate the pressure drop error signal 29a. The pressure drop error signal 29a passes the second proportional integrator 35 and the feedwater pump speed bias signal converter 37, thereby being converted into the auxiliary control signal 37a. The auxiliary control signal 37a is combined with the main control signal 33a at the correction control signal generator 34, thereby generating the correction control signal 34a. The main control signal 33a is processed by the main feedwater pump speed signal converter 33 based on the flow request signal 31c output from the first proportional integrator 31.

The control unit 30 controls the main feedwater pump 3 based on the correction control signal 34a. Here, in the second high signal selection unit 36, the auxiliary control signal 37a output from the feedwater pump speed bias signal converter 37 is compared with another auxiliary control signal output from another feedwater control system of another steam generator before it is operated on the main control signal 33a at the correction control signal generator 34. Among them, the high auxiliary control signal is selected.

Figure 5:
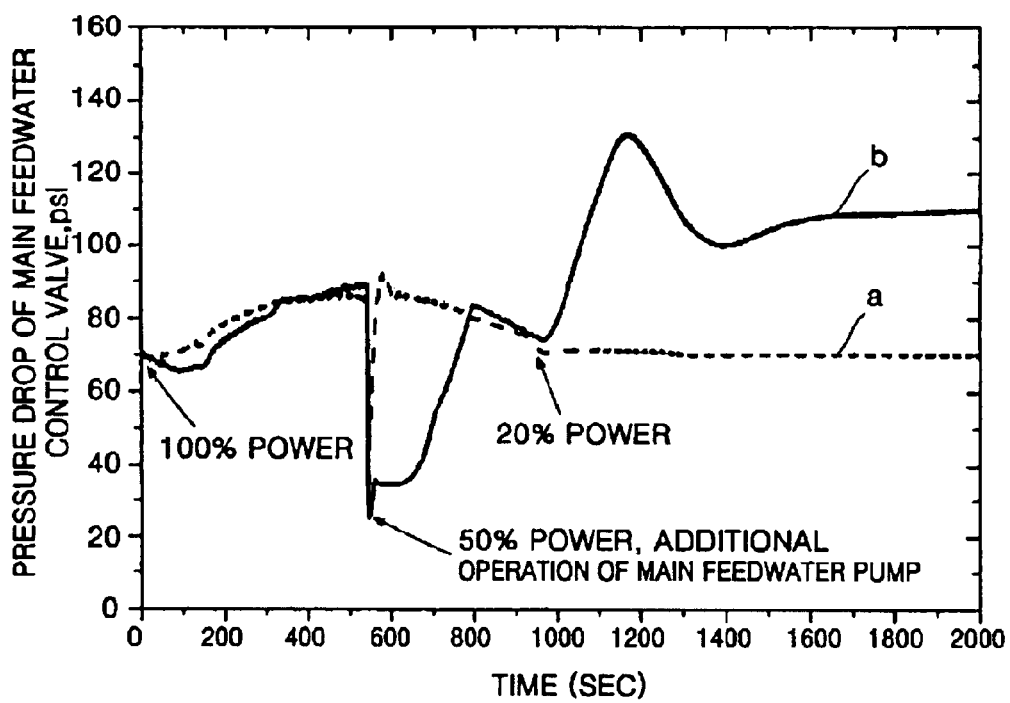
FIG. 5 is a graph illustrating a comparison of a pressure drop of the main feedwater control valve with respect to the power of main feedwater control valve according to the prior art and the present invention.

FIG. 5 is a graph illustrating a comparison of the pressure drop of the main feedwater control valve with respect to the power of the main feedwater control valve according to the prior art and the present invention. As can be seen, in case of the feedwater control system b of the nuclear power plant according to the prior art, the pressure drop of the main feedwater control valve is greatly changed when the nuclear reactor power of the main feedwater control valve is reduced by 5% per minute. On the contrary, in case of the feedwater control system a of the nuclear power plant according to the present invention, the pressure drop of the main feedwater control valve is maintained almost constantly.

As described above, the auxiliary control signal 37a based on the pressure drop error signal 29a is added/subtracted to/from the main control signal 33a based on the flow request signal 31c, thereby generating the correction control signal 34a. The main feedwater pump 3 is controlled by the correction control signal 34a. In this manner, the pressure drop of the feedwater control valves of the nuclear power plant is constantly maintained without the nuclear reactor power or without regard to the kinds and number of the operating feedwater equipment. As a result, the process of selecting the setup value of the feedwater control system is simplified and the optimization is possible. It is possible to solve the control instability or the degradation of the control performance, which may be caused by the high or low pressure drop of the feedwater control valves. Also, since the valve is always switched at a constant opening in a valve switch from the downcorner feedwater control valve 7 to the main feedwafer control valve 5 or a valve switch from the main feedwater control valve 5 to the downcorner feedwater control valve 7, the transition state occurring at the valve switch can be remarkably reduced. The pressure drop of the feedwater control valves can be monitored in real time in operation, and the valve pressure drop can be maintained in the overall output section constantly to some degree. Thus, it is possible to secure the mechanical stability of the valve and to easily cope with the variation of the feedwater equipment in operation or the rapid transition state in the water level of the steam generator. Even when the pressure drop measurement signal is lost, the speed of the main feedwater pump 3 is changed within a limit of the bias signal. Therefore, the transition state can be minimized. If necessary, no auxiliary control signal 37a based on the pressure drop error signal 29a may be generated.

In this embodiment, the pressure drop sensor unit 21 includes the main feedwater common header pressure sensor 22 and the steam header pressure sensor 23. As described above, the pressure drop signal 21a is a difference between the main feedwater common header pressure signal and the steam header pressure signal. The pressure drop sensor unit 21 is provided with a plurality of sensors that are installed in the front and rear portions adjacent to the main feedwater control valve 5 and the downcorner feedwater control valve 7. In case of the 20% or less nuclear reactor power, that is, in case when the downcorner feedwater control valve 7 alone is operated, the pressure drop signal 21a may be a pressure difference between the front and rear portions of the downcorner feedwater control valve 7. In case of 20% or more nuclear reactor power, the pressure drop signal 21a may be a pressure difference between the front and rear portions of the main feedwater control valve 5.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A feedwater control system considering a pressure drop of feedwater control valves in a nuclear power plant, the feedwater control system for controlling a water level of a steam generator by adjusting a feedwater flow introduced into the steam generator through a control of one or more main feedwater pumps, main feedwater control valves and downcorner feedwater control valves, the feedwater control system comprising:

a first detection unit including: a flow error signal generator for generating a flow error signal corresponding to a difference between a steam flow signal and a feedwater flow signal, wherein the steam flow signal corresponds to a steam flow discharged from the steam generator and the feedwater flow signal corresponds to a feedwater flow introduced into the steam generator; and a water level correction error signal generator for generating a water level correction error signal corresponding to a sum of a water level measurement signal and the flow error signal, wherein the water level measurement signal corresponds to a difference between a water level measurement signal and a water level setup signal, the water level measurement signal corresponding to a measured water level of the steam generator, the water level setup signal corresponding to a previously set water level of the steam generator;

a second detection unit including: a pressure drop sensor unit for detecting a pressure difference between front and rear portions of at least one feedwater control valve among the main feedwater control valves and the downcorner feedwater control valves and generating a pressure drop signal corresponding to the detected pressure difference; a pressure drop setup value signal generator for generating a pressure drop setup value signal corresponding to a previously set pressure drop setup value of the feedwater control valves; and a pressure drop error signal generator for comparing the pressure drop signal with the pressure drop setup value signal and generating a pressure drop error signal; and a control unit including: a first proportional integrator through which the water level correction error signal passes; a main feedwater pump speed signal converter through which a flow request signal processed through the first proportional integrator passes; a second proportional integrator through which the pressure drop error signal passes; a feedwater pump speed bias signal converter through which a bias signal processed through the second proportional integrator passes; and a correction control signal generator in which an auxiliary control signal output from the feedwater pump speed bias signal converter is operated on a main control signal output from the main feedwater pump speed signal converter, wherein the control unit controls the main feedwater pump based on a correction control signal output from the correction control signal generator.

2. The feedwater control system of claim 1, wherein the pressure drop sensor unit includes:

a main feedwater common header pressure sensor which measures pressures of main feedwater common headers installed between the main feedwater pump and the feedwater control valves; and a steam header pressure sensor which measures a pressure of a steam header through which steam discharged from the steam generator passes, wherein the pressure drop signal is a difference between main feedwater header pressure signal and steam header pressure signal, which are respectively output from the main feedwater common header pressure sensor and the steam header pressure sensor.

3. The feedwater control system of claim 1, wherein the pressure drop setup value signal generator further includes a low power bias signal generator for generating a low power bias signal, the low power bias signal being added to the pressure drop setup value signal in case when the downcorner feedwater control valve alone is operated while the main feedwater control valve is not operated.

4. The feedwater control system of claim 1, wherein the control unit further includes a first high signal selector for comparing the flow request signal, which is processed through the first proportional integrator, with another flow request signal output from another feedwater control system of another steam generator before the flow request signal is input to the main feedwater pump speed signal converter, and selecting a high flow request signal.

5. The feedwater control system of claim 1, wherein the control unit further includes a second high signal selector for comparing the auxiliary control signal, which is output from the feedwater pump speed bias signal generator, with another auxiliary control signal output from another feedwater control system of another steam generator before the auxiliary control signal is operated on at the correction control signal generator, and selecting a high auxiliary control signal.

6. A feedwater control method considering a pressure drop of feedwater control valves in a nuclear power plant, the feedwater control method for controlling a water level of a steam generator by adjusting an adjustment of a feedwater flow introduced into the steam generator through a control of one or more main feedwater pumps, main feedwater control valves and downcorner feedwater control valves, the feedwater control method comprising:

(a) measuring a water level of the steam generator and generating a water level measurement signal corresponding to the measured water level; generating a water level measurement signal corresponding to a difference between the water level measurement signal and a water level setup signal, in which the water level setup signal corresponds to a previously set water level of the steam generator; measuring a steam flow discharged from the steam generator and generating a steam flow signal corresponding to the measured steam flow; measuring a feedwater flow introduced into the steam generator and generating a feedwater flow signal corresponding to the measured steam flow; generating a flow error signal corresponding to a difference the steam flow signal and the feedwater flow signal; and generating a water level correction error signal corresponding to a sum of the water level measurement signal and the flow error signal;

(b) detecting a pressure difference between front and rear portions of at least one feedwater control valve among the main feedwater control valves and the downcorner feedwater control valves and generating a pressure drop signal corresponding to the detected pressure difference; and comparing the pressure drop signal with a previously set pressure drop setup value signal and generating a pressure drop error signal; and (c) generating a main control signal by passing a flow request signal through a main feedwater pump speed signal converter, the flow request signal being generated by passing the water level correction error signal through a first proportional integrator; generating an auxiliary control signal by passing a bias signal through a feedwater pump speed bias signal converter, the bias signal being generated by passing the pressure drop error signal through a second proportional integrator; generating a correction control signal by performing an operation of the main control signal and the auxiliary control signal; and controlling the main feedwater pump, based on the correction control signal.

7. The feedwater control method of claim 6, wherein the pressure drop signal in (b) is obtained by:

measuring pressures of main feedwater common headers installed between the main feedwater pump and the feedwater control valves;

measuring pressure of a steam header through which steam discharged from the steam generator passes; and operating a difference between the pressure of the main feedwater common header and the pressure of the steam header.

8. The feedwater control method of claim 6, wherein the pressure drop setup value signal is a signal to which a predetermined low power bias signal is added in case when the downcorner feedwater control valve alone is operated while the main feedwater control valve is not operated.

9. The feedwater control method of claim 6, wherein (c) further comprises:

comparing the flow request signal, which is processed through the first proportional integrator, with another flow request signal output from another feedwater control system of another steam generator before the flow request signal is input to the main feedwater pump speed signal converter; and selecting a high flow request signal.

10. The feedwater control method of claim 6, wherein (c) further comprises:

comparing the auxiliary control signal, which is output from the feedwater pump speed bias signal generator, with another auxiliary control signal output from another feedwater control system of another steam generator before the auxiliary control signal is operated on at the correction control signal generator; and selecting a high auxiliary control signal.

* * * * *